United States Patent
Skolicki et al.

(10) Patent No.: US 10,511,872 B2
(45) Date of Patent: *Dec. 17, 2019

(54) SYSTEMS AND METHODS THAT MATCH SEARCH QUERIES TO TELEVISION SUBTITLES

(71) Applicant: GOOGLE LLC, Mountain View, CA (US)

(72) Inventors: Zbigniew Skolicki, Cracow (PL); Yaroslav Volovich, Cambridge (GB); Ant Oztaskent, London (GB); Varun Rajgarhia, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/148,972

(22) Filed: Oct. 1, 2018

(65) Prior Publication Data
US 2019/0037260 A1     Jan. 31, 2019

Related U.S. Application Data

(63) Continuation of application No. 15/438,583, filed on Feb. 21, 2017, now Pat. No. 10,091,541, which is a
(Continued)

(51) Int. Cl.
*H04N 21/25* (2011.01)
*H04N 21/45* (2011.01)
(Continued)

(52) U.S. Cl.
CPC ......... *H04N 21/252* (2013.01); *G06F 16/245* (2019.01); *G06F 16/738* (2019.01);
(Continued)

(58) Field of Classification Search
CPC ............. H04N 21/252; H04N 21/4524; H04N 21/4884; G06F 17/30796; G06F 17/3084; G06F 17/30787
See application file for complete search history.

(56) References Cited

U.S. PATENT DOCUMENTS 7,542,967 B2   6/2009  Hurst-Hiller et al.
8,122,011 B1   2/2012  Garg et al.
(Continued)

FOREIGN PATENT DOCUMENTS

WO   WO 2011/102886   8/2011

OTHER PUBLICATIONS

Google Inc., International Search Report and Written Opinion, PCT/US2015/031621, dated Aug. 4, 2015, 10 pgs.
(Continued)

*Primary Examiner* — Chenea Davis
(74) *Attorney, Agent, or Firm* — Morgan, Lewis & Bockius LLP

(57) ABSTRACT

A process identifies a search query spike from queries submitted by users during a first span of time, which is less than a predefined duration. The spike corresponds to a set of queries identified as equivalent. The frequency of submitting queries from the set during the first time span exceeds the frequency of submitting queries from the set during an average span of time. The process correlates the spike to a broadcast video program by matching terms from the set of search queries to subtitle terms appearing in the video program at a first location. The first location in the video program was broadcast within a predefined time before the first span of time. The process receives notification from a user device indicating user interest in the video program.
(Continued)

The process transmits to the user device search results corresponding to some search queries from the set of search queries.

20 Claims, 11 Drawing Sheets

Related U.S. Application Data continuation of application No. 14/335,834, filed on Jul. 18, 2014, now Pat. No. 9,578,358.

(60) Provisional application No. 61/982,761, filed on Apr. 22, 2014.

(51) Int. Cl.
    *G06F 16/245* (2019.01)
    *G06F 16/738* (2019.01)
    *G06F 16/783* (2019.01)
    *H04N 21/81* (2011.01)
    *H04N 21/488* (2011.01)

(52) U.S. Cl.
    CPC ....... *G06F 16/7844* (2019.01); *H04N 21/251* (2013.01); *H04N 21/4524* (2013.01); *H04N 21/4532* (2013.01); *H04N 21/4884* (2013.01); *H04N 21/8133* (2013.01); *G06F 16/7834* (2019.01)

(56) References Cited

U.S. PATENT DOCUMENTS

| | | | |
|---|---|---|---|
| 8,176,068 | B2 | 5/2012 | Kunjithapatham et al. |
| 8,370,380 | B1* | 2/2013 | Kuraoka ............ G06F 16/3323 707/767 |
| 2007/0050406 | A1* | 3/2007 | Byers ...................... G06F 16/48 |
| 2008/0186810 | A1* | 8/2008 | Kumaran ................ G11B 27/28 369/30.08 |
| 2009/0254415 | A1 | 10/2009 | Bhaysar |
| 2011/0289098 | A1 | 11/2011 | Oztaskent et al. |
| 2012/0019732 | A1 | 1/2012 | Lee et al. |
| 2012/0066059 | A1 | 3/2012 | Berger |
| 2012/0189273 | A1 | 7/2012 | Folgner et al. |
| 2012/0291072 | A1 | 11/2012 | Maddison et al. |
| 2012/0310628 | A1 | 12/2012 | Rathod et al. |
| 2013/0024443 | A1* | 1/2013 | Achuthan ........... G06Q 30/0201 707/722 |
| 2013/0070163 | A1 | 3/2013 | Connors |
| 2013/0212113 | A1 | 8/2013 | Acharya et al. |
| 2013/0298146 | A1 | 11/2013 | Conrad et al. |
| 2014/0101551 | A1 | 4/2014 | Sherrets et al. |
| 2014/0140679 | A1 | 5/2014 | Khader et al. |

OTHER PUBLICATIONS

Nichols, Summarizing sporting events using twitter, 2012 ACM International Conference on Intelligent User Interfaces, IUI '12, Lisbon, PT, Feb. 14-17, 2012, 10 pgs.

Skolicki, Non Final Office Action, U.S. Appl. No. 14/335,851, dated May 16, 2016, 9 pgs.

Skolicki, Notice of Allowance, U.S. Appl. No. 14/335,851, dated Aug. 18, 2016, 5 pgs.

\* cited by examiner

SYSTEMS AND METHODS THAT MATCH SEARCH QUERIES TO TELEVISION SUBTITLES

RELATED APPLICATION

This application is a continuation of U.S. patent application Ser. No. 15/438,583, titled "Systems and Methods that Match Search Queries to Television Subtitles," filed Feb. 21, 2017, which is a continuation of U.S. patent application Ser. No. 14/335,834, titled "Systems and Methods that Match Search Queries to Television Subtitles," filed Jul. 18, 2014, now U.S. Pat. No. 9,578,358, which claims priority to U.S. Provisional Application Ser. No. 61/982,761, filed Apr. 22, 2014, entitled "Systems and Methods that Match Search Queries to Television Subtitles," which are incorporated by reference herein in their entirety.

TECHNICAL FIELD

The disclosure relates generally to providing information about television programs, and more specifically to providing information based on matching of search queries to television subtitles.

BACKGROUND

With the increased use of mobile devices, some users use second screen applications while watching television. The "second screen" is typically a mobile device, such as a smart phone or tablet computer, but may be any computing device, such as a laptop computer or desktop computer located near a television. The second screen application may provide additional information or interaction with a television program.

One difficulty for a second screen application is identifying what might be of interest to the user. For example, while watching a movie, what information about the movie would the user find useful or entertaining?

Some second screen applications predict the type of audience based on the TV program and the location of the viewer. For example, if the content is targeted to women who are older than 50, and a viewer is in a residential neighborhood, a second screen application can select a subset of topics that such an audience would like. However, this methodology is not precise enough. Another alternative is to conduct live polls related to the show, but this could be costly and relies on continuous invasive polling. In addition, it would be difficult to get information quickly enough.

SUMMARY

Disclosed implementations address the above deficiencies and other problems associated with providing useful and relevant information for a second screen application. Some implementations use search queries from users, and match the search queries to subtitles in television programs to identify interesting aspects of television programs. Some implementations automatically identify text corresponding to a program by analyzing the audio stream.

One can match queries submitted to a search engine against TV content that is or was broadcast to multiple viewers in the same time frame. Some implementations select query candidates by analyzing the frequency that queries are submitted. When there is a sudden increase in the query frequency for a given query (a query "spike"), there is a good likelihood that it corresponds to a specific event (e.g., a scene from a movie was just broadcast).

Some implementations match queries to broadcast content by means of matching keywords, phrases, or concepts in search queries to appropriate counterparts in television subtitles, co-occurring within some time window. For example, if the term "gobble stopper" is mentioned on some TV channel, and appears in subtitles, viewers might be interested in the definition of "gobble stopper" or want more details. Within a short time (e.g., a minute), some viewers start entering queries in a search engine. This creates an observable spike in the frequency of "gobble stopper" queries. Some implementations identify such a spike by comparing the average frequency of requests for the query (e.g., measured in query submissions per minute) with a current frequency for the same query (e.g., during the past hour, past 15 minutes, or past five minutes). Some implementations identify such a spike by comparing the maximum frequency of requests for the query over a recent moving time window (e.g., the most recent hour or half hour of query frequency data—excluding the most recent few minutes) with a current frequency for the same query. Some implementations identify such a spike by comparing a combination of the maximum frequency of requests and the average frequency of requests with a current frequency for the same query.

In addition to matching queries by keywords or phrases, some implementations match concepts, which are sometimes referred to as knowledge graph entities. This accounts for the situation where different people use different words or phrases to describe the same conceptual entity.

For each detected candidate spike (query or entity) implementations check whether the words, keywords, phrases, or conceptual entities are correlated with data in subtitles of any monitored TV channel within the last few minutes (e.g., within the last five minutes or within the last 10 minutes). In some implementations, the check includes determining whether most of query words, keywords, phrases, or entities are present within the moving window of subtitles for a single television program. In some implementations, the order of the terms from each query is evaluated as well, with a preference for matching subtitles that appear in the same order. Alternatively, some implementations perform the matching in the opposite direction: checking whether parts of subtitles are present in a search query.

When there is a non-empty intersection between query elements and subtitle elements for a television program within a given moving time window, there is a potential match. In some implementations, the overlap is evaluated to compute a score, and when the score exceeds a threshold value, it is considered a match. Some implementations impose additional constraints for matching, such as the expected order of the terms.

For live content, some implementations access the stream of submitted queries within viewers' interest time (e.g., within the last 30 seconds or the last minute), and capture TV subtitles fast enough, and are thus able to present results of queries to subtitle matches to viewers of a given program. In some implementations, the results are sent to users who use a dedicated application (e.g., a second screen application) on a client device, such as a smart phone or tablet computer. In some implementations, the second screen application identifies the TV program that a user is viewing so that relevant search results for that program are provided. In this way, implementations leverage the search queries submitted by a few people to provide information for others.

In some implementations, the corresponding search results are provided to a user after the program ends. In some cases, the search results are filtered or aggregated, especially if the search results are collected for multiple spikes in a program.

Some implementations apply voice recognition algorithms directly to the TV content to generate a stream of words to match on rather than relying on subtitles. In some implementations, both subtitles and voice recognition are used.

Some implementations match search queries to TV content by individual user. For example, by knowing that a given user watches specific TV content, and that the user issued a given query, user specific matching is possible. In this case aggregation is not needed, and the results are customized for a particular user (or a group of users).

Some implementations use the fact that the same TV program is typically broadcast in different time zones, and thus can use spike information from earlier time zones to provide information more quickly for later time zones. In this way, later time zones may not experience the initial delay to identify a spike. For example, the viewers of the very first airing of a show (e.g., on the east coast of the United States) will see the results slightly delayed because the system has to wait for other users to actually perform the search. However viewers of following airings (e.g., viewers on the west coast of the United States who are watching a 3-hour delayed version of the show) can be shown the results at the exact time of the related content (as opposed to the time of the spike).

Some implementations use collected historical data of spikes and the correlations with TV content as input to train a machine learning system (e.g., a support vector machine or a neural network). In this way, a machine learns which types of content are more likely to cause a spike. The generated model is then applied to TV programs in real-time while they are broadcast. This way, even users of the very first airing may be presented related results without waiting for an actual spike to occur.

In accordance with some implementations, a method executes at a server system with one or more processors and memory. The memory stores one or more programs configured for execution by the one or more processors. The process identifies a search query spike from search queries submitted by a plurality of users during a first span of time. The first span of time is less than a predefined duration. The search query spike corresponds to a set of one or more search queries identified as equivalent. The frequency of submitting queries from the set during the first time span exceeds the frequency of submitting queries from the set during an average span of time by a predefined threshold percentage. The process correlates the search query spike to a broadcast video program by matching one or more terms from the set of search queries to one or more subtitle terms appearing in the video program at a first location. The first location in the video program was broadcast within a predefined time before the first span of time. The process receives notification from a user device indicating user interest in the video program (e.g., the user is watching the video program on TV). Based on the spike and the user's interest in the video program, the process transmits to the user device search results corresponding to one or more search queries from the set of search queries.

Thus methods and systems are provided that provide useful and relevant information for a second screen application, and provide the information timely.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
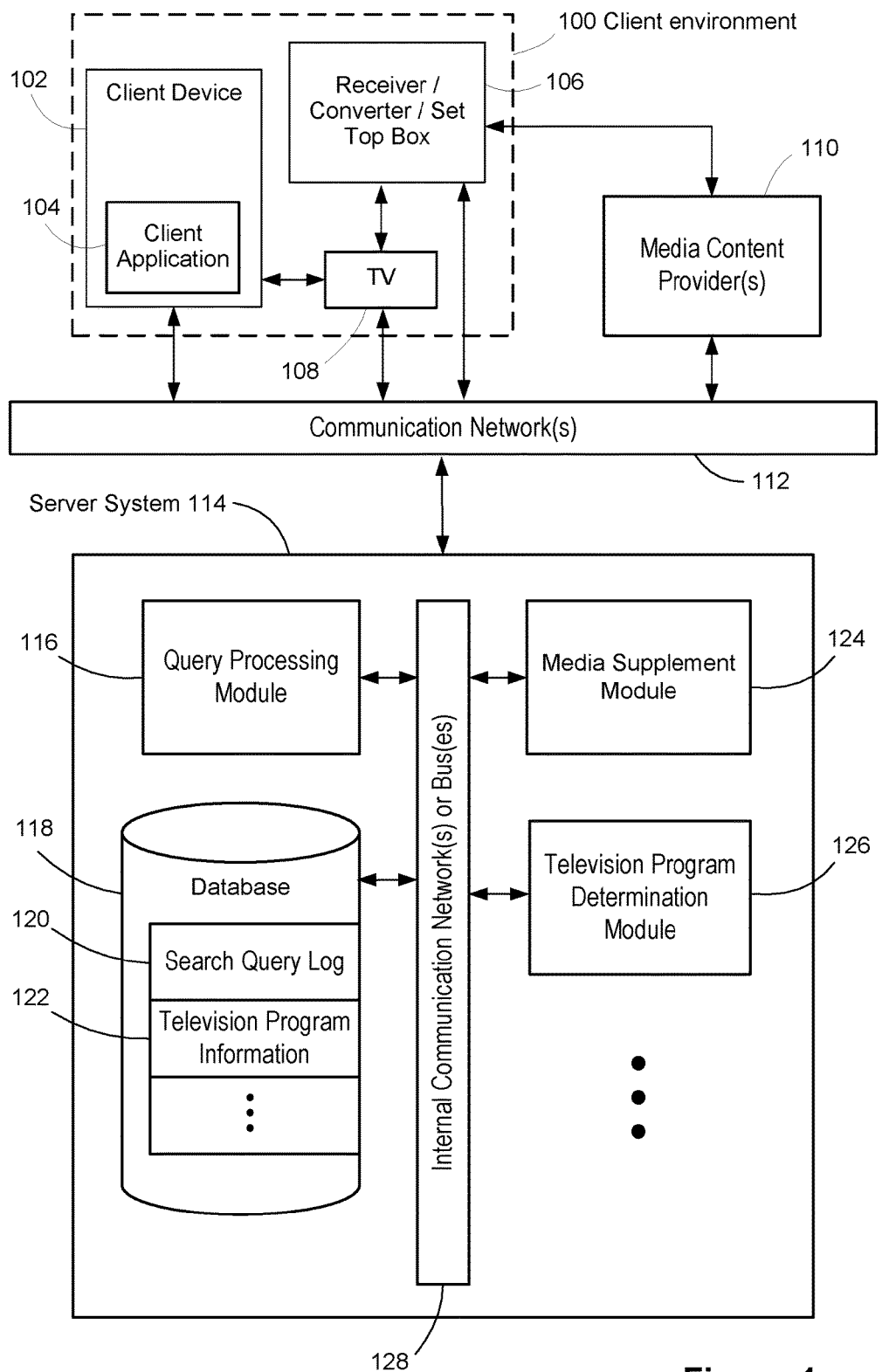
FIG. 1 illustrates a context in which some implementations operate.

FIG. 1 is a block diagram that illustrates the major components of some implementations. The various client devices 102 and servers 300 in server system 114 communicate over one or more networks 112 (such as the Internet). A client environment 100 includes a television 108, which is typically connected to a set top box 106 (or a receiver/converter). The set top box 106 receives media content from a content provider 110, such as a cable TV network, a satellite dish network, or broadcast over the airwaves. As illustrated in FIG. 1, in some cases the media content is transmitted through the communication networks 112.

The client environment 100 also includes one or more client devices 102, such as smart phones, tablet computers, laptop computers, or desktop computers. In the context here, the client device is typically in close proximity to the television 108. Running on the client device is a client application 104, which in some implementations is a "second screen application" that correlates with the programming displayed on the television 108. In some implementations, the client application runs within a web browser 222. Although only a single client environment 100 is illustrated in FIG. 1, there are typically millions of client environments at any time. Different client environments 100 may use different media content providers 110, and may use varying combinations of client devices 102 and boxes 106 that function as receivers, converters, or set top boxes. Although FIG. 1 illustrates a single set top box 106, one of skill in the art would recognize that other environments could consist of a plurality of distinct electronic components, such as a separate receiver, a separate converter, and a separate set top box. Also, some or all of the functionality of the set top box 106 (or converter or receiver) may be integrated with the television 108.

The server system 114 includes a plurality of servers 300, and the servers 300 may be connected by an internal communication network of bus 128. The server system 114 includes a query processing module 116, which receives queries from users (e.g., from client devices 102) and returns responsive query results. The queries are tracked in a search query log 120 in a database 118.

The server system 114 also includes a television program determination module 126, which determines what television programs viewers are watching. In some implementations, the television program determination module 126 receives notifications from a client application 104 running on a client device 102, and the notification specifies the television program that is being presented on the associated television 108. In some implementations, the television program determination module 126 receives notification from the set top box 106 (e.g., when the user at the client environment registers to have viewership tracked). In some implementations, the television program determination module receives an audio stream (from the client application 104 or the set top box) and determines the television program by analyzing the stream. In some implementations, the television program determination module 126 is part of the client application 104, and the determined programs are communicated to the media supplement module 124.

The server system includes a media supplement module 124, which provides additional information about television programs to the client application 104, such as search results corresponding to aspects of the viewed television programs. The operation of the media supplement module 124 is described in more detail throughout this disclosure, including with respect to FIG. 10.

The server system includes one or more databases 118. The data stored in the database 118 includes a search query log 120, which tracks each search query submitted by a user. In some implementations, the search query log is stored in an aggregated format to reduce the size of storage. The database also includes television program information 122. The television program information 122 may include detailed information about each of the programs, including subtitles, as well as broadcast dates and times. Some of the information is described below with respect to FIGS. 4-6.

Figure 2:
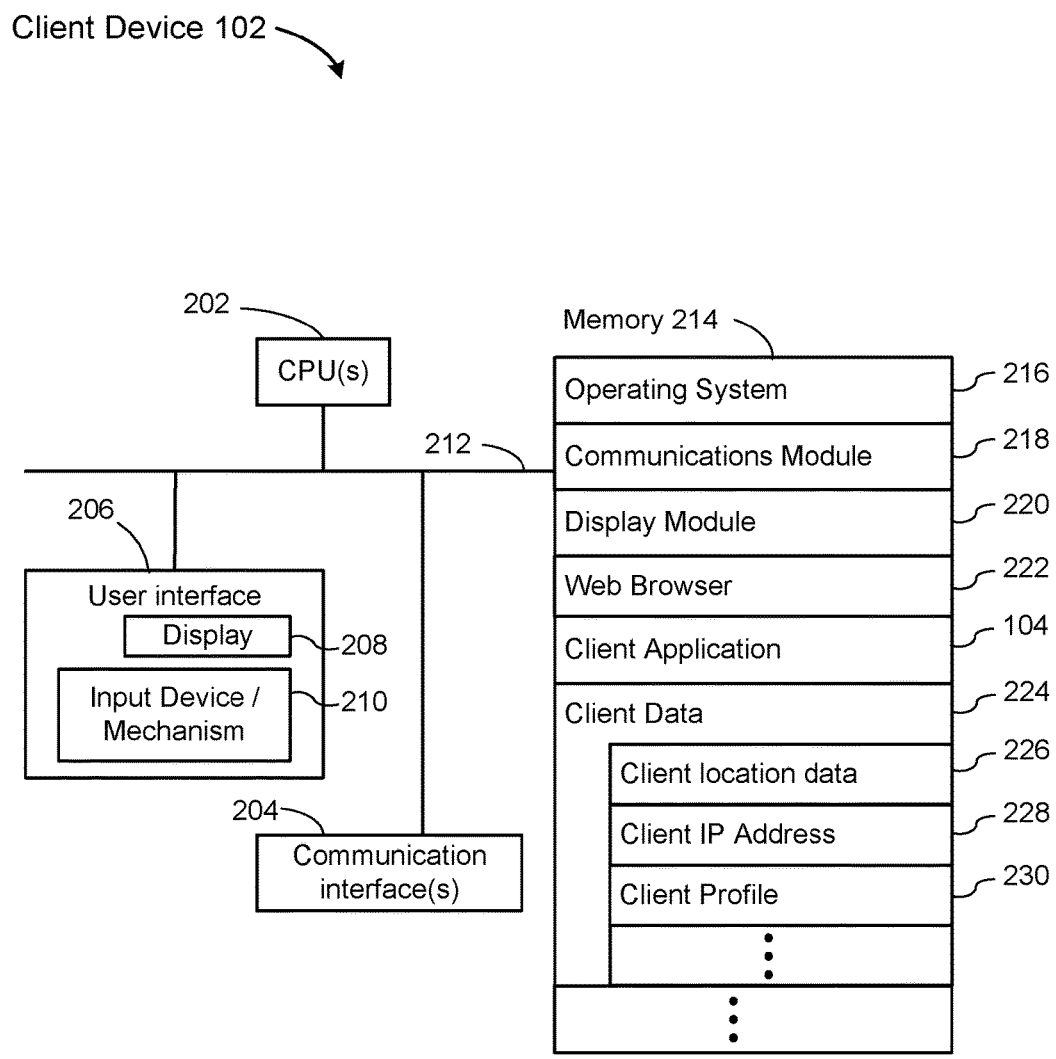
FIG. 2 is a block diagram of a client device according to some implementations.

FIG. 2 is a block diagram illustrating a client device 102 that a user uses in a client environment 100. A client device 102 typically includes one or more processing units (CPU's) 202 for executing modules, programs, or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 106 to other computers and devices via the one or more communication network interfaces 204 (wired or wireless) and one or more communication networks 112, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 112 (such as the Internet) with remote computers or devices;
- a client application 104, which may be used in conjunction with a television 108 and set top box 106 to provide a more interactive media experience. In some implementations, the client application 104 is a "second screen application," which provides additional information about a broadcast television program, or enables the user to interact with the television program (e.g., providing immediate feedback, voting on topics, and so on). In some implementations, the client application 104 runs within the web browser 222. In some implementations, the client application 104 runs as a application separate from the web browser; and
- in some implementations, the client device stores various client data 224, which may be stored in a database, one or more cookies, a computer registry, or other files in the memory 214. In some implementations, the client data includes client location data 226. The client location data may specify a geographical location of the client environment 100, such as a city, region, or country. In some implementations the location is specified by longitude and latitude. In some implementations the location is specified according to what broadcast media is available to the client environment 100. In some implementations, the client data includes a client IP address 228, which is the IP address of the client environment 100 as seen from the external communications networks 112. The IP address 228 is typically the external IP address of a home router or modem (not an internal home network IP address). In some implementations, the client data 224 includes a client profile 230, which may include various information about the client device 102, information about the user of the client device, including user preferences, or information about the client environment 100 (e.g., demographic information about registered households).

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
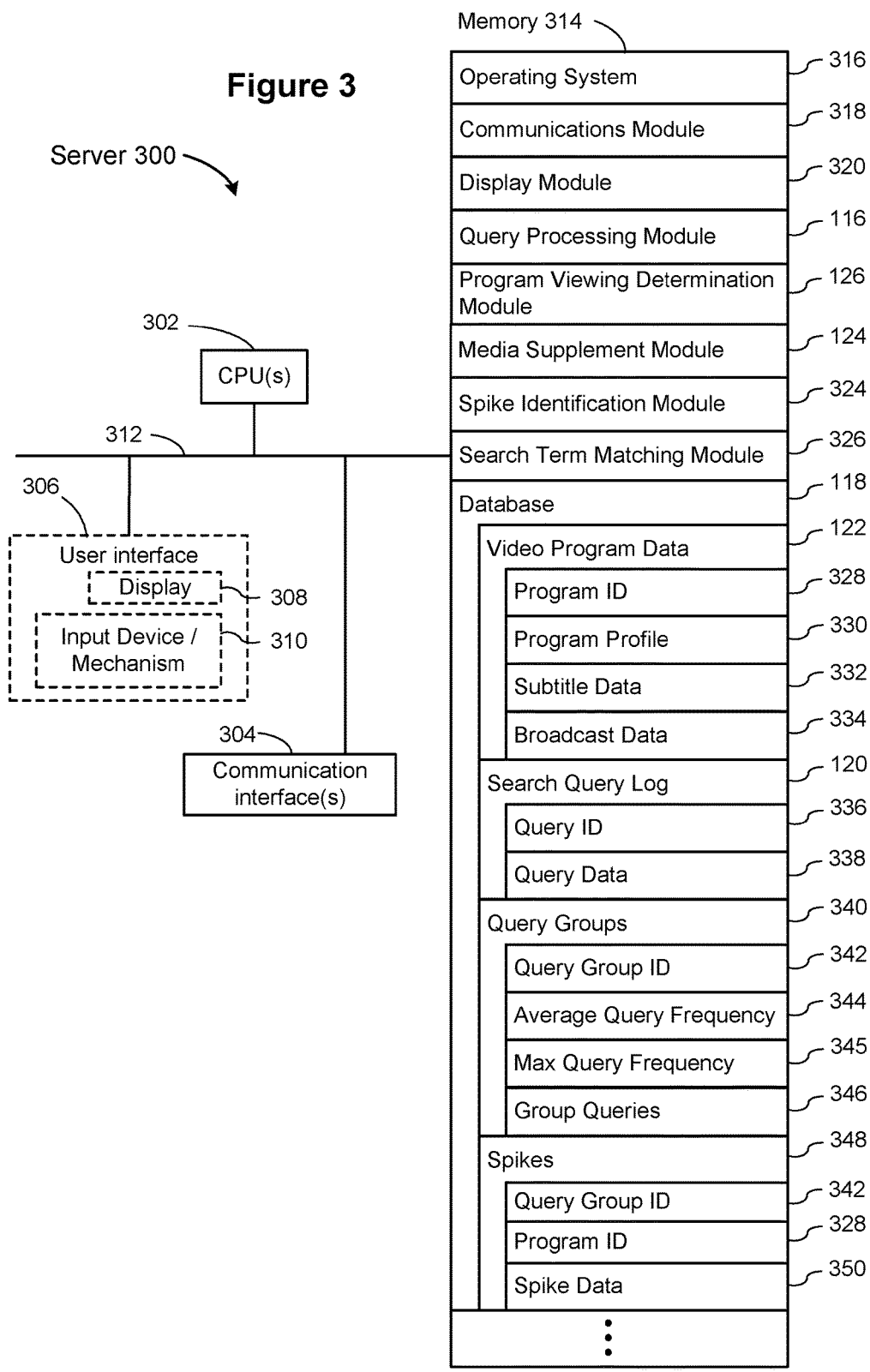
FIG. 3 is a block diagram of a server according to some implementations.

FIG. 3 is a block diagram illustrating a server 300 that may be used in a server system 114. A typical server system includes many individual servers 300, which may be hundreds or thousands. A server 300 typically includes one or more processing units (CPU's) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 128, or other communication networks 112, such as the Internet, other wide area networks, local area networks, metropolitan area networks, and so on;
- a display module 320, which receives input from one or more input devices 310, and generates user interface elements for display on a display device 308;
- a query processing module 116, which receives search queries from client device 102, and returns responsive search results. In some implementations, each query is logged in the search query log 120;
- a program viewing determination module 126, as described above with respect to FIG. 1;
- a media supplement module 124, which provides supplemental information to a user about a television program being currently viewed on a television 108 near a computing device 102. In addition to general information about a television program, the supplemental information includes specific information or search results directly related to the portion of the video program currently being viewed (with a small delay). The media supplement module is described in more detail with respect to FIGS. 10-12 and 13A-13C below;
- a spike identification module 324, which identifies spikes for specific queries during short periods of time. The spike identification module 324 is described in more detail with respect to FIG. 10. In some implementations, the spike identification module 324 is a submodule of the media supplement module;
- a search term matching module 326, which matches various similar queries together to form query groups 340, and also matches search queries to video program subtitles (or extracted text using audio recognition software). The search term matching module is described in more detail below with respect to FIGS. 10-12 and 13A-13C. Typically, the search term matching module 326 forms the query groups 340 prior to identifying spikes using the spike identification module 324; and
- one or more databases 118, which store various data used by the modules described herein.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

In some implementations, the database 118 stores video program data 122. Each video program includes a program ID 328, and various other information, which may be subdivided into separate data structures.

Figure 4:
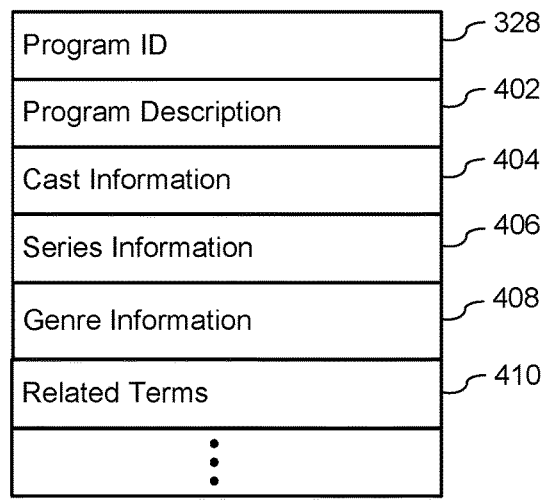
FIGS. 4-9 illustrate various skeletal data structures or tables used by some implementations.

In some implementations, the video program data for each program includes a program profile 330, which is described in more detail with respect to FIG. 4. The profile includes the program ID 328, which is a unique identifier for each video program. In some implementations, the profile 330 includes a program description 402, which may comprise one or more paragraphs that describe the program. The profile 330 may include cast information 404, which includes details about individual cast members or links to further information about the cast members (e.g., links to cast member web pages). For video programs that are part of a series, some implementations include series information 406 in the profile 330. In some implementations, the profile 330 includes genre information 408, which may include general information about the genre of the video program, and may provide links to additional information. In some implementations, the profile 330 includes related terms 410, which may include key terms that describe the video program or may identify terms that enable a user to identify related content.

Figure 5:
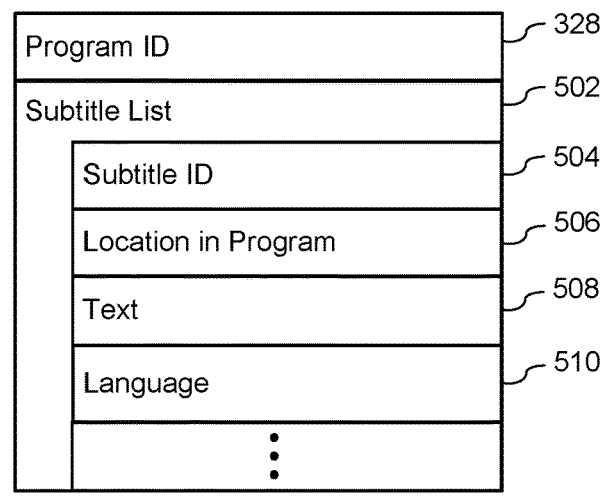

In some implementations, the video program data includes subtitle data 332, as illustrated in FIG. 5. In some instances, the subtitle information is publicly available beforehand, but in other instances, the subtitle information is dynamically extracted and stored as a video program is broadcast.

In some implementations, the subtitle data includes the program ID 328 and a subtitle list 502, which is a sequential list of the subtitles that appear in the video program. For video programs that scroll the subtitles, portions of the subtitle text may scroll in and out of view during windows of time (e.g., showing line 1 and line 2 during a first period of time, showing line 2 and line 3 during a second period of time, showing line 3 and line 4 during a third period of time, and so on). To address this type of subtitle, some implementations allow overlapping text between successive subtitles. Some implementations store each distinct portion of text, and allow overlapping periods of time.

The subtitle list includes a sequence of subtitle text portions. Each portion is identified by a subtitle ID 504. In some implementations, the subtitle ID is globally unique, but in other implementations, the subtitle ID is unique only within a give program ID 328. The subtitle ID 504 may be a sequential number within each video program. Each subtitle portion includes data that specifies the location 506 within the program. In some implementations, this is specified as an offset (e.g., in seconds) from the beginning of the video program. In some implementations, the location information 506 also includes the length of time the subtitle is displayed or an ending time for the subtitle (e.g., the offset in seconds to the end of the period of time that the subtitle is displayed). Some implementations address commercial breaks in various ways. In some implementations, the locations 506 are specified only with respect to the media content itself, and adjust for commercial breaks dynamically based on the actual lengths of the commercial breaks. In some instances, if the lengths of the commercial breaks are predefined, the locations 506 can include the commercial breaks, effectively treating the commercials as part of the video program.

Each subtitle portion also includes the text 508 in the subtitle. In some implementations, the text is parsed into a sequence of words, and may eliminate punctuation. In some implementations, the language 510 of the subtitles is also stored. Some implementations store additional or different data, or store the data in alternative formats (e.g., tokenized).

In addition to the information about video program content or the subtitles, some implementations store information about when the video program has been or will be broadcast. Some implementations focus on video programs that are broadcast on a predefined schedule, and thus multiple viewers are viewing the same video program at the same time. Different techniques are applied to use video on demand (VOD) data, and may not use a broadcast data table 334.

Figure 6:
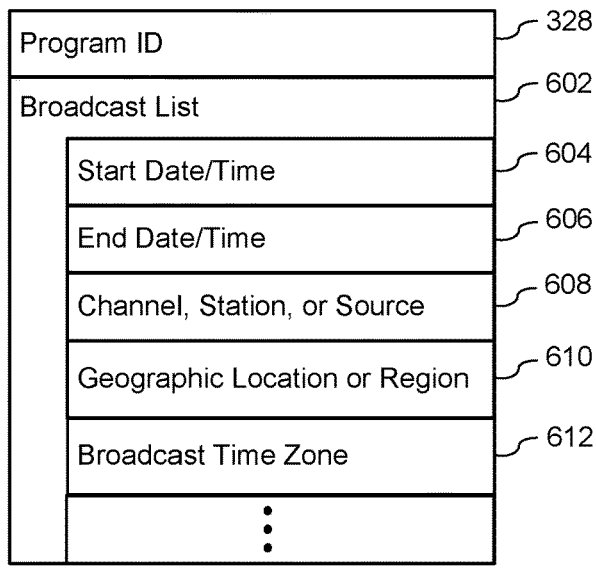

FIG. 6 illustrates a skeletal data structure for storing broadcast data 334. Broadcast data 334 includes a program ID 328 and a broadcast list 602, which identifies when the video program has or will be broadcast. In some implementations, each broadcast instance has a start time 604 and an end time 606. In some implementations, each broadcast instance includes a start time 604 and a duration. In some implementations, each broadcast instance includes information 608 that specifies the channel, station, or other source of the broadcast. In some implementations, each broadcast instance includes information 610 that specifies the geographic location or region where the broadcast occurred. In some implementations, the information 610 is a broadcast area. In some implementations, each broadcast instance stores the time zone 612 of the broadcast.

Figure 7:
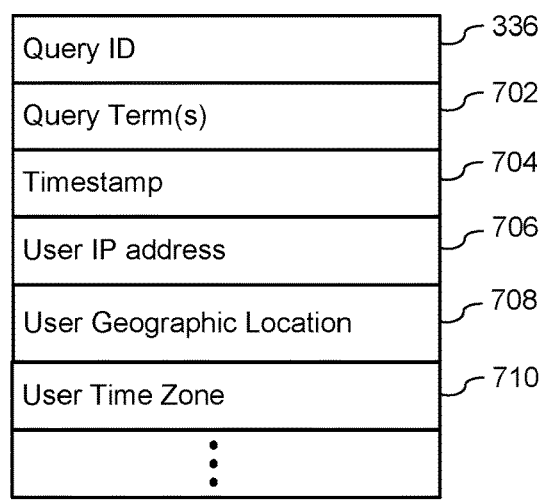

As noted above, the database 106 may store a search query log 120. In some implementations, each search query is assigned a unique query ID 336 (e.g., globally unique). In addition, the log stores various search query data 338, as illustrated in FIG. 7. Each query includes a set of query terms 702, which may be parsed to eliminate punctuation. In some implementations, typographical errors are retained because they may match typographical errors that appear in video program subtitles.

The query data 338 typically includes a timestamp 704 that specifies when the query was issued. In some implementations, the timestamp 704 is based on the user time zone 710, which is also stored. In other implementations, the timestamp 704 represents a server generated timestamp indicating when the query was received. Some server systems 114 include one or more servers 300 that accurately manage timestamps in order to guarantee both accuracy of the data as well as sequential consistency. In some implementations, a server timestamp 704 together with the user time zone 710 (as well as knowing the server time zone) allows the server system to accurately know when each query was submitting according to the user's local time, and does not rely on the user's client device 102. In some implementations, the query data includes the user's IP address 706 and the user's geographic location 708. The set of possible values for the user's geographic location 708 typically corresponds to the same set of values for the geographic location or region 610 used for video broadcasts.

Figure 11:
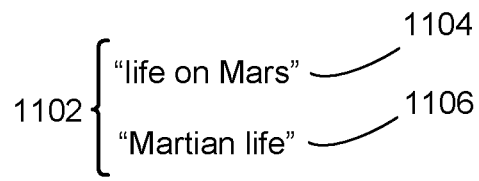
FIGS. 11 and 12 illustrate how some queries may be grouped together according to some implementations.
Figure 12:
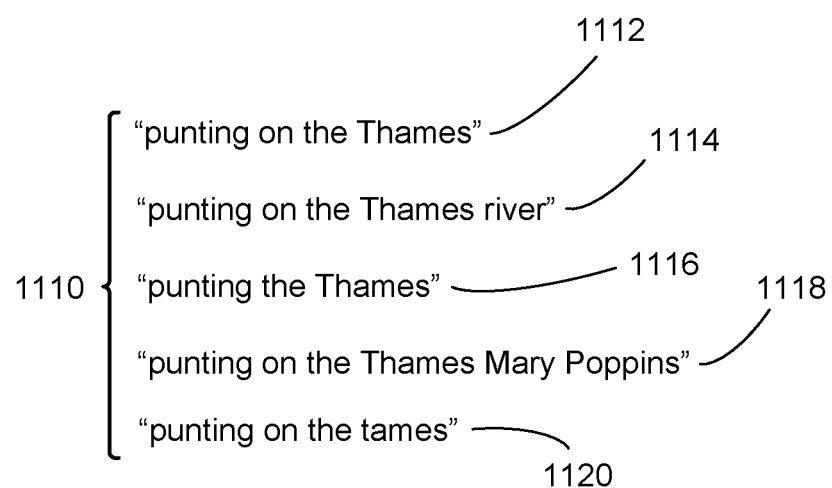

In some implementations, the database 118 stores query groups 340, which identify sets of queries that are considered equivalent. Some of the ways that queries may be grouped together are illustrated in FIGS. 11 and 12. Each query group has a query group ID 342, which uniquely identifies the group. Associated with each group is an average query frequency 344, which may be expressed in query instances per minute or query instances per hour. The average 344 may be computed over a period of time, such as week or a month. In some implementations, the average is computed over a shorter period of time (e.g., the last 24 hours) in order to keep the value relatively current. Because spikes are identified relative to the background average 344, the average is kept up to date. For example, the background average 344 may fluctuate slowly over time, which does not constitute a spike.

In some implementations, a maximum query frequency 345 is computed and updated over a moving time window for each query group 340. The time window is typically short and relatively recent (e.g., the most recent hour or half hour). Because the maximum query frequency is used to detect spikes, the time window generally excludes the most recent few minutes in order to avoid overlap with an actual current spike. In some implementations, a spike is identified for a group relative to just the maximum query frequency 345. In other implementations, a spike is identified using both the average query frequency 344 and the maximum query frequency 345. In implementations where a spike is identified relative to the maximum query frequency 345, the spike is identified for a respective group when the current group query frequency exceeds the saved maximum query frequency by a substantial factor (e.g., twice the maximum query frequency). In some implementations where a spike is identified based on a combination of average query frequency 344 and maximum query frequency 345, the spike is identified when the current query activity exceeds some numerical combination (such as linear combination) of the average and maximum query frequencies for that group. In some implementations, a spike is identified when the current query activity exceeds both the maximum query frequency and the average query frequency (e.g., by predefined factors). In some implementations, a spike is identified when the current query activity exceeds either the maximum query frequency or the average query frequency.

Figure 8:
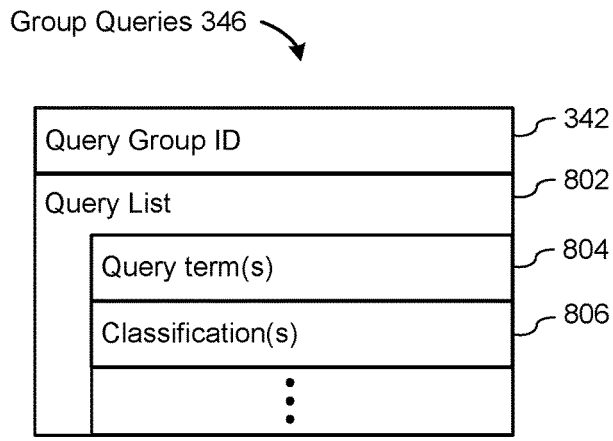

As illustrated in FIG. 8, each query group 340 includes a set 346 of queries that are in the group. The set of queries 346 includes the query group ID 342, and the query list 802. Each query instance includes a set of query terms 804, which may be stored in varying formats (e.g., the complete query as originally submitted, complete queries with punctuation removed, or a list of individual terms). In addition, some implementations include a set of query classifications 806, which may be humanly meaningful or generated as part of a trained machine learning classifier.

The database 118 also stores spike information 348. A spike is associated with a specific query group, which is identified by its query group ID 342, and is associated in some cases with a specific video program identified by a program ID 328.

Figure 9:
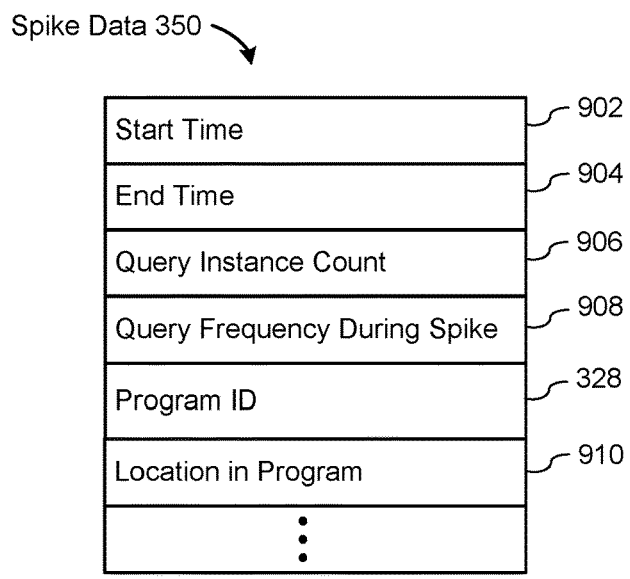

FIG. 9 illustrates other spike data 350 that some implementations track for each spike. In some implementations, each spike has an associated start time 902 and an end time 904, which are generally based on the server clock. In some implementations, the spike data 350 includes a timestamp when the spike reached a peak, which may be stored instead of the start time 902 and end time 904. In some implementations, the spike data 350 includes a query instance count 906, which indicates the number of distinct query instances during the spike. In some implementations, the spike data 350 includes a computed query frequency 908. Note that query frequency=query instance count 906/(end time 904−start time 902). While a spike is occurring, the data may be updated almost constantly. When a spike has been matched to subtitles of a video program, the spike data may include the program ID 328 of the corresponding video program, and a location 910 in the video program where the matched subtitles appeared. The location may be specified as an offset from the beginning of the program, or a timestamp indicating the broadcast time of the portion of the video program with the matching subtitles. When a timestamp is used to specify the location, implementations may use the timestamp when the subtitle portion started, when it ended, or the middle. In some implementations, the location information 910 specifies the interval of time rather than a single point (e.g., start and end or start and duration).

Figure 10:
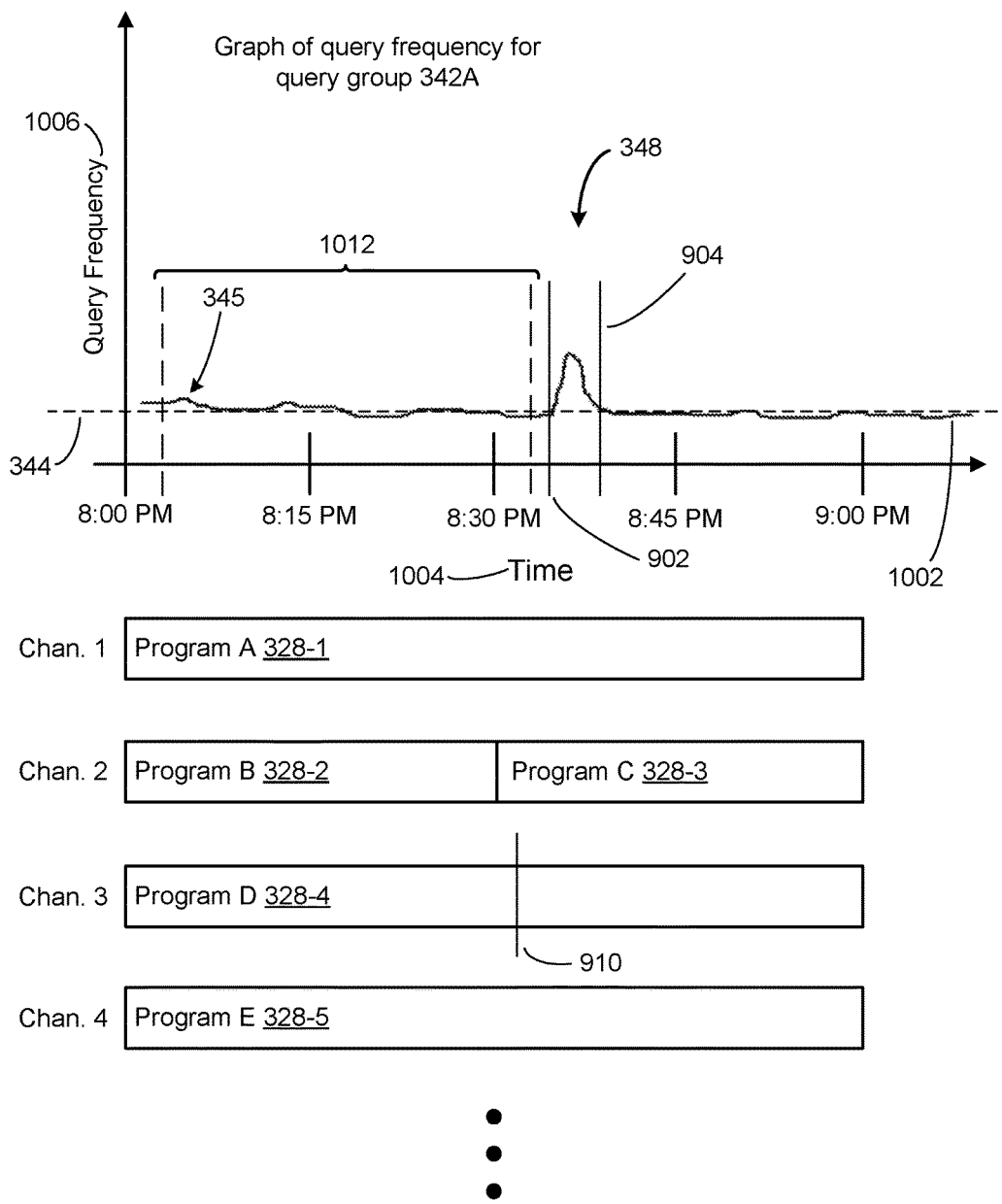
FIG. 10 illustrates how a spike is identified and related to a video program according to some implementations.

FIG. 10 illustrates visually the identification of a query spike and correlating the spike to a video program. In the upper half of FIG. 10 is a graph showing query frequency 1006 versus time 1004 for a specific query group 342A. The time period displayed is the time between 8:00 PM and 9:00 PM on a certain day. The curve 1002 shows how the query frequency fluctuates, but stays near the background average 344 most of the time. However, we can see a spike 348 in query frequency between the start time 902 and the end time 904. The increased query frequency during the spike includes all of the queries in the query group 342A. For implementations that identify spikes based on recent maximum query frequency 345 for a group, the recent maximum query frequency for the group is determined in a window 1012 (defined between the dashed lines) of the query frequency data that precedes the current time.

Below the graph are the program lineups for four channels. Channel 1 is presenting program A 328-1 during this hour. Channel 2 is presenting program B 328-2 during the first half hour and program C 328-3 during the second half hour. Channel 3 is presenting program D 328-4 during the hour, and channel 4 is presenting program E 328-5 during the hour. The server system 114 collects subtitle data 332 for the five program 328-1, . . . , 328-5 dynamically while they are broadcast.

Once the spike 348 is detected, the query terms are compared against the subtitle terms for a recent period of time prior to the beginning of the spike 348 (e.g., 1 minute, 5 minutes, or ten minutes). In this case, a match is detected with program D 328-4 at location 910. In some cases, a match is detected by matching specific words or keywords in the subtitles. In other cases, the match is detected based on a sequence of words or a matching linguistic concept. In some implementations, the matching is performed by a classifier trained on data from previously stored subtitles and query groups. Some examples of matching are illustrated with respect to FIGS. 11 and 12.

As illustrated in this example, the spike is detected without regard to the specific users who submitted the queries. In some implementations, the users may be any people who submit queries to the query module 116. In some implementations, the set of users is limited to those who have installed the client application 104 on a client device 102. In this case, the queries tracked are based on the client application, and thus generally related to video programs. When queries are tracked for all users, the queries are not necessarily related to television, so there can be substantial overhead costs. In some implementations, spike results are generated only from queries from unique users. In some such implementations, unique users are determined by storing user query sets in server memory 314 and then discounting (i.e., not using in spike detection) duplicate queries from the same user.

After the spike 348 is detected and matched to a specific location 910 in a specific program 328-4, the queries in group 342A are known to be relevant to the location 910 in the program 328-4. Therefore, users who are watching the program 328-4 might be interested in the search results for those queries. In some implementations, the client application 104 informs the server system 114 of what video programs the user is watching, and the server system tracks that information (e.g., in the database 118). In some implementations, as part of informing the server of what programs the user is watching, the client application 104 captures audio and/or video from a currently playing TV program in proximity to the user device (e.g., with a smart phone microphone and/or camera) and then sends one or more audio and/or video snippets, or fingerprints of those snippets, to the server, which identifies the currently playing program by correlating the audio and/or video snippets or fingerprints to program information available to the server (e.g., TV program streams and/or video archives). In some implementations, the set top box 106 tracks what a user is watching for registered users, and provides that information to the server system 114 (which may be stored in the database 118). Then, when a spike is detected and correlated to a specific video program, the media supplement module 124 can provide the corresponding search results to the client devices corresponding to users who are watching that video program. Although there is some delay, users can get search results fairly quickly.

In some implementations, the search results are presented on a second screen device (e.g., client device 102) or in a window on the television 108 (e.g., using a picture in picture window). Similarly, the search queries themselves (the one in the spike) may be presented, either on the client device 102 or on the television. In some implementations, a user may select from the queries, and receive search results corresponding to the selected queries.

FIG. 11 illustrates one way of matching that does not require literal matching of identical terms. Sometimes people express the same basic concept using different terms. In this example, the phrase "life on Mars" 1104 expresses the same concept as "Martian life" 1106, but the two phrases use different words and word order. If these two phrases were submitted as queries to the search query module 116, some implementations would group them together in a single query group 1102. The same process of concept matching can be applied when matching query terms to subtitle terms from a video program. For example, if there is a spike in submissions of the "life on Mars" 1104 query, and "Martian life" 1106 appears in the subtitles of a broadcast video program, some implementations would correlate them.

FIG. 12 illustrates another way of matching query terms. In this case, a match is identified when two sets of terms have sequences of terms that are substantially the same. In some cases the sequences are exactly the same, but in other cases, there is some slight variation, as illustrated by these examples. For example, the sequences 1112 and 1114 differ only in that sequence 1114 has added the term "river" at the end. They are substantially the same. The sequence 1116 is also substantially the same as sequence 1112 because the only difference is omitting the insignificant term "on." Although the sequence 1118 adds the two terms "Mary Poppins," some implementations would classify it as substantially the same as the first sequence 1112 because it includes a significant sequence that is identical to sequence 1112. The final example 1120 illustrates that some implementations also account for misspellings or typographical errors. Some people (e.g., Americans) might not know how to spell "Thames," but there is sufficient context in sequence 1120 to consider it a match. Some implementations would group together all five of these sequences into a single group 1110, and measure query frequency based on the total aggregated queries submitted for all of them.

In addition to grouping together by various matching techniques as illustrated in FIGS. 11 and 12, some implementations group together queries using a clustering algorithm.

The examples in FIGS. 11 and 12 are also applied to matching between submitted queries and subtitle terms.

Figure 13A:
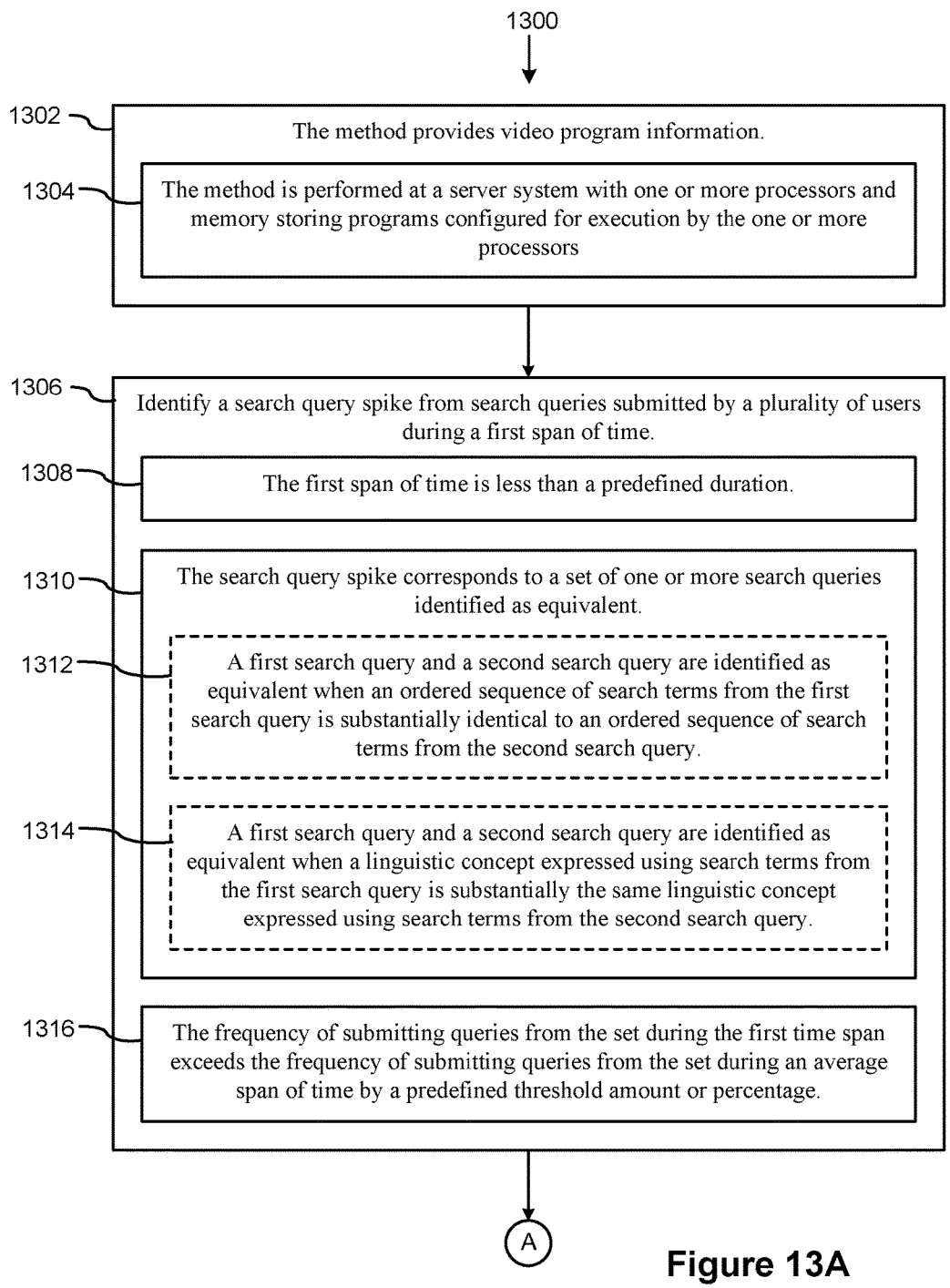
FIGS. 13A-13C provide a flowchart of a process, performed at a server system, for providing video program information according to some implementations.
Figure 13B:
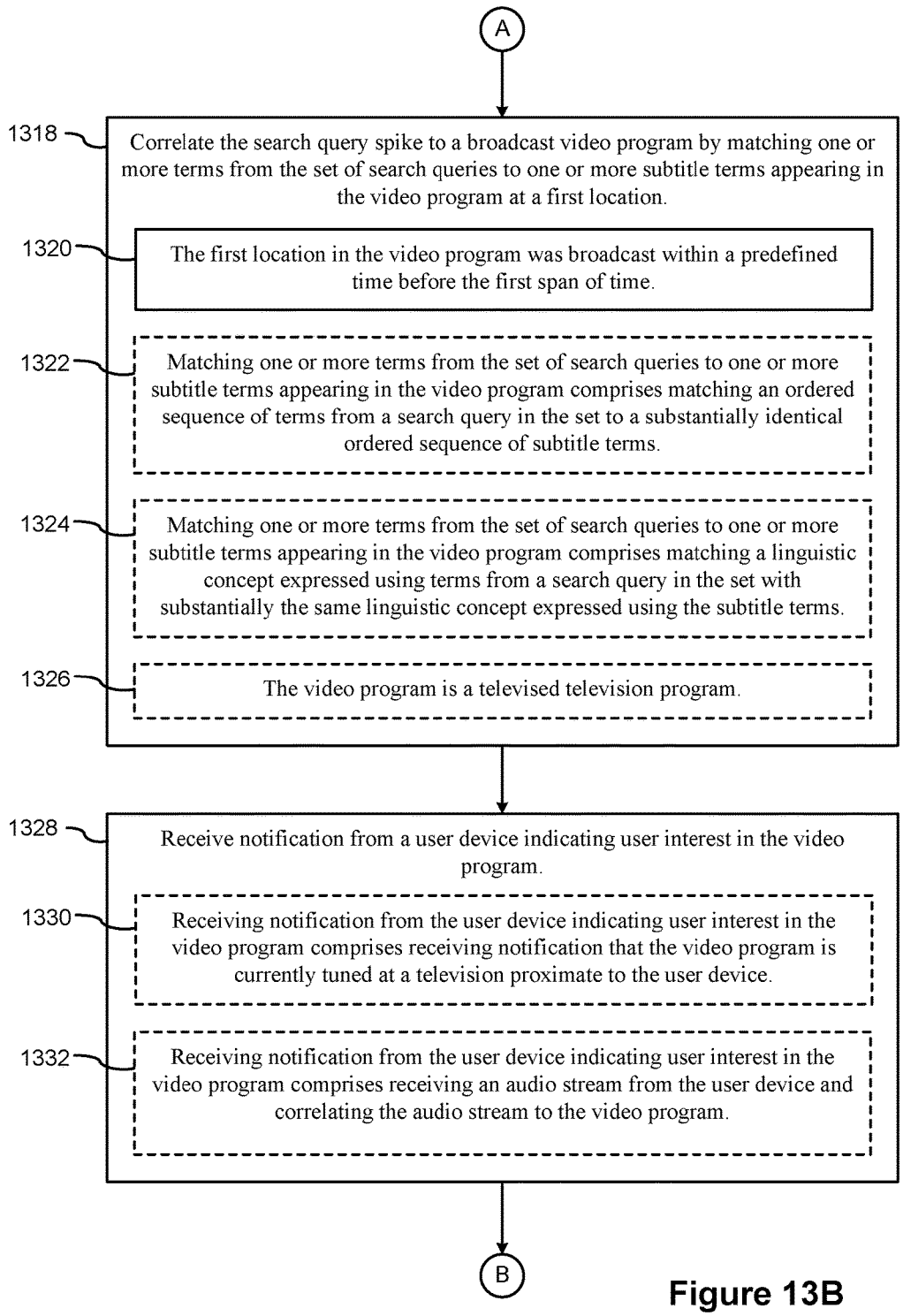
Figure 13C:
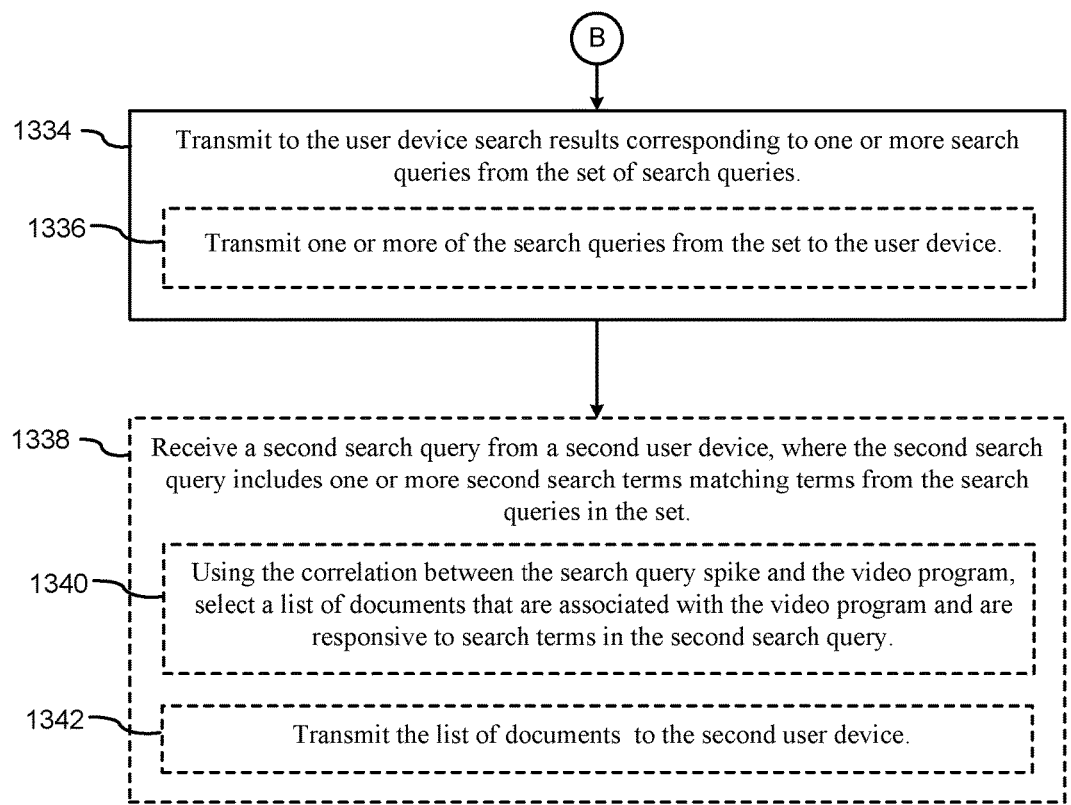

FIGS. 13A-13C provide a flowchart of a process 1300, performed by a server system 114 for providing (1302) video program information. The method is performed (1304) at a server system with one or more processors and memory. The memory stores (1304) programs configured for execution by the one or more processors.

The process 1300 identifies (1306) a search query spike 348 from search queries submitted by a plurality of users during a first span of time. This was illustrated above in FIG. 10. In some implementations, the search queries are from users running the client application 104. In some implementations, the users are not necessarily using the client application 104.

A spike represents a short term increase in the query frequency, and thus the first span of time has (1308) a limited duration (e.g., less than a predefined duration, such as five minutes). The search query spike 348 corresponds (1310) to a set of one or more search queries that are identified as equivalent. Different people express the same basic query in different ways, so implementations generally group them together for more accurate reporting.

In some implementations, a first search query and a second search query are identified (1312) as equivalent when an ordered sequence of search terms from the first search query is substantially identical to an ordered sequence of search terms from the second search query. This was illustrated above with respect to FIG. 12. In some implementations, a first search query and a second search query are identified (1314) as equivalent when a linguistic concept expressed using search terms from the first search query is substantially the same linguistic concept expressed using search terms from the second search query. This was illustrated above with respect to FIG. 11.

A "spike" is more than a little bump in the query frequency. Here, a spike is identified when the frequency of submitting queries from the set during the first time span exceeds (1316) the frequency of submitting queries from the set during an average span of time by a predefined threshold amount or percentage. For example, some implementations specify the threshold percentage as 25% or 50%. Some implementations use an even higher percentage in order to focus on significant spikes. Some implementations have an adaptive percentage based on the query group or other factors. For example, if the number of relevant spikes in the past half hour has been small, the required threshold percentage may be reduced in order to identify more spikes.

The search term matching module 326 then correlates (1318) the search query spike to a broadcast video program by matching one or more terms from the set of search queries to one or more subtitle terms appearing in the video program at a first location. The matching may involve matching specific words or keywords, phrase, or conceptual entities. Some examples are illustrated in FIGS. 11 and 12. The first location in the video program was broadcast (1320) within a predefined time before the first span of time. This is consistent with the goal of identifying spikes that are triggered by specific media content. In some instances, the search term matching module stitches together subtitles from two or more consecutive segments in order to match search queries.

In some implementations, matching one or more terms from the set of search queries to one or more subtitle terms appearing in the video program comprises (1322) matching an ordered sequence of terms from a search query in the set to a substantially identical ordered sequence of subtitle terms. This was illustrated above with respect to FIG. 12. In some implementations, matching one or more terms from the set of search queries to one or more subtitle terms appearing in the video program comprises (1324) matching a linguistic concept expressed using terms from a search query in the set with substantially the same linguistic concept expressed using the subtitle terms. This was illustrated above with respect to FIG. 11. In some implementations, the video program is (1326) a televised television program. In some instances, the video program is streamed from the Internet, and may comprise alternative media content.

When a spike is detected and correlated to a specific video program, information relevant to that video program at the current location (in the program) may be provided to users who are viewing the video program. In some implementations, the client application 104 notifies the server system about what program is being viewed, or the information may be transmitted by a set top box. The server system receives (1328) the notification from the user device 102 (or set top box 106), which indicates the user's interest in the video program. Receiving the notification may occur before or after the spike is detected and correlated to the video program. Typically the notification is received beforehand, as soon as the user starts watching the program.

In some instances, receiving notification from the user device indicating user interest in the video program comprises (1330) receiving notification that the video program is currently tuned at a television proximate to the user device. In some instances, receiving notification from the user device indicating user interest in the video program comprises (1332) receiving an audio stream from the user device—including captured audio from the currently playing video program—and correlating the audio stream to the video program. In some implementations, the audio stream from the user device includes one or more audio snippets from the currently playing video program (along with associated timestamp information) or fingerprints generated by the user device from one or more portions of audio from the currently playing program.

The media supplement module transmits (1334) to the user device 102 search results corresponding to the one or more search queries in the set of search queries. In some implementations, the media supplement module also transmits (1336) one or more of the search queries in the set to the user device 102.

In some implementations, the detection of spikes and the correlation with video programs may be used to enhance search queries submitted by other users, including users who are not necessarily running the client application 104. In some implementations, the query processing module 116 receives (1338) a second search query from a second user device 102, where the second search query includes one or more second search terms matching terms from the search queries in the set. Using the correlation between the search query spike and the video program, the query module 116 selects (1340) a list of documents that are associated with the video program and are responsive to search terms in the second search query. The query processing module 116 then transmits (1342) the list of documents to the second user device.

The terminology used in the description of the invention herein is for the purpose of describing particular implementations only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. For example, some implementations use posts to social media sites (e.g., Twitter®) instead of search queries, or supplement search queries with posts to social media sites. In some implementations, the techniques are expanded to encompass video on demand (VOD), in which the presentation to individual users does not follow a predefined schedule. When a user has the client application 104 and views an on-demand video program, matching can be performed without aggregation. Later, the results from multiple users can be aggregated and correlated to identify spikes. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method for providing video program information, comprising:

at a server system with one or more processors and memory storing programs configured for execution by the one or more processors:

identifying a search query spike from search queries submitted by a first plurality of users during a first span of time, wherein the first span of time is less than a predefined duration, the search query spike corresponds to a set of one or more search queries identified as equivalent, and a frequency of submitting queries from the set during the first time span exceeds a frequency of submitting queries from the set during an average span of time by a predefined threshold percentage;

correlating the search query spike to a broadcast video program broadcast during the first span of time by matching a plurality of terms from the set of search queries to a plurality of subtitle terms appearing in the video program at a first location, wherein the first location in the video program was broadcast within a predefined time before the first span of time;

receiving notification from a user device during a second span of time subsequent to the first span of time indicating user interest in the video program; and in direct response to receiving the notification indicating user interest in the video program, transmitting to the user device search results corresponding to one or more search queries from the set of search queries, such that the search results are presented at the user device at the same time as the first location in the video program when the video program is broadcast during the second span of time.

2. The method of claim 1, further comprising transmitting one or more of the search queries from the set to the user device.

3. The method of claim 1, wherein a first search query and a second search query are identified as equivalent when: (i) an ordered sequence of search terms from the first search query is substantially identical to an ordered sequence of search terms from the second search query, and/or (ii) a linguistic concept expressed using search terms from the first search query is substantially the same linguistic concept expressed using search terms from the second search query.

4. The method of claim 1, wherein receiving notification from the user device indicating user interest in the video program comprises receiving notification that the video program is currently tuned at a television proximate to the user device.

5. The method of claim 1, wherein receiving notification from the user device indicating user interest in the video program comprises receiving an audio stream from the user device and correlating the audio stream to the video program.

6. The method of claim 1, wherein matching a plurality of terms from the set of search queries to a plurality of subtitle terms appearing in the video program comprises (i) matching an ordered sequence of terms from a search query in the set to a substantially identical ordered sequence of subtitle terms, and/or (ii) matching a linguistic concept expressed using terms from a search query in the set with substantially the same linguistic concept expressed using the subtitle terms.

7. The method of claim 1, wherein the video program is a televised television program.

8. The method of claim 1, further comprising:
receiving a second search query from a second user device, wherein the second search query includes one or more second search terms matching terms from the search queries in the set;
using the correlation between the search query spike and the video program, selecting a list of documents that are associated with the video program and are responsive to search terms in the second search query; and
transmitting the list of documents to the second user device.

9. The method of claim 1, wherein the user device is a second screen device, and the video program is tuned at a television proximate to the user device.

10. The method of claim 1, wherein a search result transmitted to the user device in the second time zone corresponds to a plurality of search queries from the set of search queries.

11. A server system for providing video program information, comprising:
one or more processors;
memory; and
one or more programs stored in the memory configured for execution by the one or more processors, the one or more programs comprising instructions for:
identifying a search query spike from search queries submitted by a first plurality of users during a first span of time, wherein the first span of time is less than a predefined duration, the search query spike corresponds to a set of one or more search queries identified as equivalent, and a frequency of submitting queries from the set during the first time span exceeds a frequency of submitting queries from the set during an average span of time by a predefined threshold percentage;
correlating the search query spike to a broadcast video program broadcast during the first span of time by matching a plurality of terms from the set of search queries to a plurality of subtitle terms appearing in the video program at a first location, wherein the first location in the video program was broadcast within a predefined time before the first span of time;
receiving notification from a user device during a second span of time subsequent to the first span of time indicating user interest in the video program; and
in direct response to receiving the notification indicating user interest in the video program, transmitting to the user device search results corresponding to one or more search queries from the set of search queries, such that the search results are presented at the user device at the same time as the first location in the video program when the video program is broadcast during the second span of time.

12. The server system of claim 11, wherein the one or more programs further comprise instructions for transmitting one or more of the search queries from the set to the user device.

13. The server system of claim 11, wherein a first search query and a second search query are identified as equivalent when: (i) an ordered sequence of search terms from the first search query is substantially identical to an ordered sequence of search terms from the second search query, and/or (ii) a linguistic concept expressed using search terms from the first search query is substantially the same linguistic concept expressed using search terms from the second search query.

14. The server system of claim 11, wherein the instructions for receiving notification from the user device indicating user interest in the video program comprise instructions for receiving notification that the video program is currently tuned at a television proximate to the user device.

15. The server system of claim 11, wherein the instructions for receiving notification from the user device indicating user interest in the video program comprise instructions for receiving an audio stream from the user device and correlating the audio stream to the video program.

16. The server system of claim 11, wherein the instructions for matching a plurality of terms from the set of search queries to a plurality of subtitle terms appearing in the video program comprise instructions for: (i) matching an ordered sequence of terms from a search query in the set to a substantially identical ordered sequence of subtitle terms, and/or (ii) matching a linguistic concept expressed using terms from a search query in the set with substantially the same linguistic concept expressed using the subtitle terms.

17. The server system of claim 11, wherein the one or more programs further comprise instructions for:
receiving a second search query from a second user device, wherein the second search query includes one or more second search terms matching terms from the search queries in the set;
using the correlation between the search query spike and the video program, selecting a list of documents that are associated with the video program and are responsive to search terms in the second search query; and
transmitting the list of documents to the second user device.

18. The server system of claim 11, wherein the user device is a second screen device, and the video program is tuned at a television proximate to the user device.

19. The server system of claim 11, wherein a search result transmitted to the user device in the second time zone corresponds to a plurality of search queries from the set of search queries.

20. A non-transitory computer readable storage medium storing one or more programs configured for execution by a server system having one or more processors and memory storing one or more programs configured for execution by the one or more processors, the one or more programs comprising instructions for:
identifying a search query spike from search queries submitted by a first plurality of users during a first span of time, wherein the first span of time is less than a predefined duration, the search query spike corresponds to a set of one or more search queries identified as equivalent, and a frequency of submitting queries from the set during the first time span exceeds a frequency of submitting queries from the set during an average span of time by a predefined threshold percentage;

correlating the search query spike to a broadcast video program broadcast during the first span of time by matching a plurality of terms from the set of search queries to a plurality of subtitle terms appearing in the video program at a first location, wherein the first location in the video program was broadcast within a predefined time before the first span of time;

receiving notification from a user device during a second span of time subsequent to the first span of time indicating user interest in the video program; and in direct response to receiving the notification indicating user interest in the video program, transmitting to the user device search results corresponding to one or more search queries from the set of search queries, such that the search results are presented at the user device at the same time as the first location in the video program when the video program is broadcast during the second span of time.

* * * * *